(12) United States Patent
Augustin et al.

(10) Patent No.: US 9,371,502 B2
(45) Date of Patent: Jun. 21, 2016

(54) VEGETABLE OIL EXTRACTION

(75) Inventors: Mary Ann Augustin, Melbourne (AU);
Pablo Juliano, Melbourne (AU);
Raymond Mawson, Melbourne (AU);
Piotr Swiergon, Melbourne (AU); Kai Knoerzer, Melbourne (AU)

(73) Assignee: COMMONWEALTH SCIENTIFIC AND INDUSTRIAL RESEARCH ORGANISATION, Campbell, Australian Capital Territory (AU)

( * ) Notice: Subject to any disclaimer, the term of this patent is extended or adjusted under 35 U.S.C. 154(b) by 0 days.

(21) Appl. No.: 14/125,081

(22) PCT Filed: Jun. 7, 2012

(86) PCT No.: PCT/AU2012/000653
§ 371 (c)(1),
(2), (4) Date: Mar. 31, 2014

(87) PCT Pub. No.: WO2012/167315
PCT Pub. Date: Dec. 13, 2012

(65) Prior Publication Data
US 2014/0206890 A1    Jul. 24, 2014

(30) Foreign Application Priority Data

Jun. 9, 2011 (AU) .................................. 2011902275
Feb. 27, 2012 (AU) .................................. 2012900749

(51) Int. Cl.
*C11B 1/10* (2006.01)
*B01D 11/02* (2006.01)
*A23L 1/025* (2006.01)
*C11B 1/04* (2006.01)

(52) U.S. Cl.
CPC ................ *C11B 1/106* (2013.01); *A23L 1/0252* (2013.01); *B01D 11/0265* (2013.01); *C11B 1/04* (2013.01); *C11B 1/102* (2013.01)

(58) Field of Classification Search
None
See application file for complete search history.

(56) References Cited

U.S. PATENT DOCUMENTS 6,079,508 A * 6/2000 Caza .............................. 175/66
6,994,207 B2   2/2006 Takasan et al.
(Continued)

FOREIGN PATENT DOCUMENTS

GB    1104577    *  2/1968  ............... C11B 1/10
GB    2097014 A      10/1982
(Continued)

OTHER PUBLICATIONS

Soares, M.I., et al., Optimizatin of the sonicatin extractin method of Hibiscus tiliaceus L. flowers, 2006, Ultrasonics Sonochemistry, vol. 13, pp. 242-250.*
(Continued)

*Primary Examiner* — Yate K Cutliff
(74) *Attorney, Agent, or Firm* — John P. White; Cooper & Dunham LLP

(57) ABSTRACT

A method of extracting recovering oil from vegetable material in which oil bearing material is heated and subjected to sonication at least one frequency above 400 kHz, removing a first yield of oil by decanting and subjecting the retained material to centrifugal separation to separate out a second yield of oil. Preferably the raw vegetable material is passed through a screw press and the obtained material is heated and subjected to the ultrasonic treatment and then allowed to settle for a predetermined period before decanting the oil layer. Preferably two frequencies above 400 kHz are used, one below 1 MHz and the second from 1 MHz. There are many potential transducers arrangements possible for producing standing waves.

19 Claims, 10 Drawing Sheets

(56) References Cited

U.S. PATENT DOCUMENTS

| | | | |
|---|---|---|---|
| 2006/0204624 | A1 | 9/2006 | Patist et al. |
| 2008/0156737 | A1 | 7/2008 | Janssen et al. |
| 2008/0181999 | A1 | 7/2008 | Yang |
| 2008/0312460 | A1 | 12/2008 | Goodson |
| 2009/0087524 | A1 | 4/2009 | Curulli et al. |
| 2010/0068336 | A1* | 3/2010 | Singh et al. ............ 426/2 |
| 2011/0278218 | A1* | 11/2011 | Dionne et al. ............ 210/523 |
| 2012/0083618 | A1 | 4/2012 | Adnan et al. |
| 2012/0225172 | A1 | 9/2012 | Bates et al. |

FOREIGN PATENT DOCUMENTS

| | | |
|---|---|---|
| JP | S58-185695 | 10/1983 |
| JP | S62-232499 | 10/1987 |
| WO | WO 2007/033416 A1 | 3/2007 |
| WO | WO 2010/129985 A1 | 11/2010 |
| WO | WO 2010/138254 A1 | 12/2010 |

OTHER PUBLICATIONS

Sidek, H.A.A., et al., Ultrasonic Studies of Palm Oil and Other Vegetable Oils, 1996, Elaeis, vol. 8, No. 1, pp. 37-44.*

JPS62-232499, Rune, G. B., Method and apparatus for extraction of oily substance form oil seed uisng ultrasonic wave, 1987, English translation, 12 pages.*

JPS58-185695, Komi Masayoshi et al., Oil extraction from soybean or like, 1983, English translation 4 pages.*

Notification of Transmittal of the International Search Report and the Written Opinion of the International Searching Authority, or the Declaration, including an International Search Report and Written Opinion of the International Searching Authority, mailed Jul. 25, 2012 in connection with PCT International Application No. PCT/AU2012/000653, filed Jun. 7, 2012.

Vinatoru, Mircea (2001) "An overview of the ultrasonically assisted extraction of bioactive principles from herbs" *Ultrasonics Sonochemistry* 8:303-313.

English Translation of Office Action mailed Apr. 4, 2016 by the Japanese Patent Office in connection with Japanese Patent Application No. 2014-513859.

Abstracts of the Meeting of the Society of Chemical Engineers, 2009, p. 267, Japan.

Yasuda, "Decomposition of Chemical Compounds by Ultrasound and Development of Sonochemical Reactor" The Chemical Times, 2009, No. 2, pp. 2-7.

* cited by examiner

VEGETABLE OIL EXTRACTION

CROSS-REFERENCE TO RELATED APPLICATIONS

This application is a §371 national stage of PCT International Application No. PCT/AU2012/000653, filed Jun. 7, 2012, claiming priority of Australian Patent Applications Nos. 2012900749, filed Feb. 27, 2012 and 2011902275, filed Jun. 9, 2011, the contents of each of which are hereby incorporated by reference in their entirety.

TECHNICAL FIELD

This invention relates to the extraction of oil from plant sources particularly palm oil. In particular this invention addresses the recovery of oil and oil-soluble components in palm oil milling operations.

BACKGROUND

Various emerging food-processing technologies, notably ultrasonics, high-pressure processing and microwave technology are increasingly being explored and used in oil and phytonutrient recovery and in food processing operations. There is potential for the application of emerging food processing technologies in the palm oil industry. The potential applications in palm milling operations include: micro-wave assisted extraction of palm oil, ultrasound-assisted extraction and recovery of palm oil and palm phytonutrients and high pressure processing for oil and emulsion products. As the palm oil industry moves into the future, there will also be a need for improving the sustainability of palm oil processing and to reduce the carbon footprint and energy requirements of the overall processes.

Traditionally ultrasound technology has been presented as a potential processing intervention for assisting extraction, microbial inactivation, emulsification or homogenisation and de-emulsification. Ultrasonic-assisted extraction of different vegetable materials has been studied. For example, ultrasound can assist in the extraction of bioactive components from herbs at laboratory and large scale. The mechanism of ultrasonic extraction is based on the effect of sonication in breaking vegetal cells and improving diffusion and capillary processes. Ultrasound, through mechanical effects, disrupts plant cells. This facilitates penetration of an extractant into the plant cell mass, enhancing mass transfer (Mason T J, Paniwnjk L, Lorimer J P. The uses of ultrasound in food technology. Ultrasonics Sonochem 1996; 3:S253-26).

This may result in an increase in the extraction efficiency as well as extraction rate.

In addition, ultrasound has an effect on increasing the swelling of vegetal tissue, facilitating cell wall rupture and releasing intracellular components into water during sonication. Extraction enhancement by ultrasound has been attributed to the propagation of ultrasound pressure waves and resulting cavitation phenomena.

Ultrasonic separation of food ingredients has obvious advantages over conventional methods like filtration and natural settling.

Most examples to date involve the use of ultrasound in combination with organic solvents for improving the extraction of oil and oil soluble components. Examples include extraction of soy oil (Li H, Pordesima L, Weiss J. High intensity ultrasound-assisted extraction of oil from soybeans. Food Res Int 2004; 37:731-738), and soy isoflavone (Rostango M A, Palma M, Barroso C G. Ultrasound-assisted extraction of soy isoflavones. J Chromatog A 2003; 1012:119-128).

GB patent 2097014 discloses a solvent extraction method using hexane in which ultrasonic agitation at from 20 to 60 kHz for residence times of 5 to 30 seconds. European patent 243220 discloses a similar process for extracting oil from seeds using ultrasonic frequencies of 10 to 50 kHz on the seeds suspended in a solvent.

Methods also exist for ultrasound-assisted extraction in the absence of organic solvents. WO2010138254 discloses the use of ultrasound-assisted extraction of oil from palm oil mill effluent, where the aim is to increase oil recovery and reduce biochemical and chemical oxygen of palm oil mill effluent.

Ultrasonic separation of food ingredients has obvious advantages over conventional methods like filtration and natural settling. While the above background relates to extraction the subject presented here relates to separation post digestion and or maceration. The method adopted is based on the principle of standing wave fields.

In this invention we seek to employ standing waves at high ultrasonic frequencies typically greater than 400 kHz to facilitate the separation of oil from vegetal solids. It is a limitation of current ultrasonic equipment design and material limitations that at frequencies above 100 kHz it is not feasible to use any form of ultrasonic horn to propagate ultrasound. Current ultrasonic horn designs generally enable operation between 20 to 24 kHz. This means that, unlike the piezo-electric wafer stacks used to drive horn transducers, single wafer piezo-electric transducers bonded to plate surfaces are required to achieve frequencies above 100 kHz. Plate transducers operate at specific amplitudes very much lower than those accomplished by horn transducers.

At frequencies greater than 400 kHz it is practical to produce large area standing waves at low amplitudes. Pangu & Feke, 2007 and Nii et al., 2009, disclose that standing waves accomplish phase separations on the basis of the relative specific gravities of the phases. So when oil is dispersed in water primary acoustic forces will separate the oil to the wave antinodes. In the work which is the subject of these citations biphasic oil and water systems are studied at an ultrasonic frequency of 2 MHz. Further these studies teach that in order to obtain coalescence of the oil it is necessary for secondary acoustic forces perpendicular to the standing wave plane to develop as a result of the wave field being bounded by walls perpendicular to the plane of the waves. The minimum temperature at which standing waves can be used to separate oil from water is limited by the increasing viscosity of the oil as the temperature is reduced. Ideally for triglyceride vegetable oils the temperature should be as low as is practical to minimize the potential for hydrolysis of free fatty acids, oxidation of unsaturated fatty acids and destruction of sensitive phytochemicals inherent in the oils. The present invention can address the issue of reducing the temperature of current water based vegetable oil separation processes and therefore yield an increased quality.

In the situation where separation of oil from vegetal material is suspended in water a tri-phase system exists. In such a system the oil has a lower specific gravity than the other phases and will migrate to the antinodes and the residual vegetal material having a higher specific gravity than water will migrate to the nodes. In this situation the relative radius of the vegetal particles compared to the half wave length of the standing wave must be smaller; otherwise complete separation of the oil from the vegetal material will not occur. Reducing the standing wave frequency will increase the wave length and enable oil to be separated from larger vegetal particles, however the separation time is lengthened and it becomes more difficult to maintain a stable standing wave field. In a situation where the treatment is carried out at reduced temperatures enzymes such as cellulase and polygalacturonase can be introduced into the system to facilitate non-mechanical breakdown of the vegetal material (Priego-Capote & Luque de Castro, 2007), which in turn will enable the application of higher standing wave frequencies.

The conventional method for extraction of palm oil is to use a press such as a screw press to extract an oil containing liquid and then allow the oil to separate out and recover the oil. Currently the process in the extraction and recovery of palm oil involves (a) sterilisation of the fresh fruit bunches, (b) stripping the fruit from the bunch by mechanical means, (c) steeping the fruit in hot water followed by mechanical expression of the oil, typically using a screw-press, (d) settling the oil-water-residual solids mixture in a settling tank. The oil that rises to the top of the settling tank is drawn off, clarified and dried. The sludge (i.e. underflow from settling tank) is centrifuged to recover further oil which is returned to the settling tank. The sludge (ex-centrifuge) also some contains residue oil (Berger K, Production of palm oil from fruit. JAOCS 60(2), 206-210, 1983). The process is depicted in FIG. 1.

The economics of the palm oil extraction are such that a 1% increase in oil yield is economically significant.

It is desirable to improve the yield of the oil extraction process.

SUMMARY

One aspect relates to a method of extracting oil from a premacerated oil-bearing material, the method comprises the steps of:

a) subjecting the premacerated oil-bearing material to at least one sonication step, wherein at least one plate transducer emitting a frequency of at least 400 kHz is employed to create a standing wave in the macerated material;

b) separating the components to form a first oil phase and a retained material phase;

c) removing the first oil phase;

d) optionally subjecting the retained material phase to at least a second sonication step and removing a second oil phase.

In some embodiments, at least two plate transducers are used during the sonication step. In one embodiment, at least two plate transducers emit at different sonication frequencies, preferably two sonication frequencies are used one being up to 1 MHz and the other being above 1 MHz.

In some embodiments, during step (a) the premacerated material is heated to a temperature of between 0° C. to 90° C., preferably between 40 to 85° C. and in some embodiments between 55 to 65° C.

The present invention may further comprise the step subjecting the retained material phase to a centrifugal separation to obtain a further yield of oil.

The premacerated oil-bearing material is selected from the group consisting of fruit, vegetables, cereals, grasses, seeds, and mixtures thereof. In some embodiments, the fruit is derived from an oil palm tree.

In some embodiments, the methods of the present invention are configured to be performed in a continuous fashion.

Further yields of oil may be obtained by repeating step (d).

Sonication may be applied at a number of stages in the mill process including at the point of loading fresh fruit bunches into cages; prior to the digester; after the screw press; in the settling tank prior to the sludge centrifuge and to treat the sludge effluent.

Preferably the raw vegetable material is passed through a screw press and the obtained material is heated and subjected to the ultrasonic treatment and then allowed to settle for a predetermined period before recovering the oil layer. Preferably two frequencies above 400 kHz are used. Preferably one is below 1 MHz and the second is greater than 1 MHz. Preferably plate transducers are employed to create standing waves. The sound pressure level applied to the premacerated oil-bearing material is between about 1 to about 260 dB related to a reference sound pressure amplitude of $10^{-6}$ Pa. Preferably, the sound pressure level is between 180 and 240 dB. There are many potential transducers arrangements possible for producing standing waves.

The application of ultrasound improves the efficiency and recovery of oil (and possibly palm phytonutrients in selected streams) at the palm oil mill.

Acoustic separation by standing waves is in principle quite rapid, separating particles down to sub-micron size in seconds. Sonication can also reduce the pressure head needed to pump liquid, and minimize clogging and consequent maintenance costs.

Acoustic separation offers means of further segregating particles on the basis of their density and compressibility. Moreover, ultrasonic waves have the ability to alter the interaction between fat globules through acoustic pressure and under the appropriate conditions can cause aggregation of fat globules/fine particles, which then pre-disposes the separation and recovery of these particles.

BRIEF DESCRIPTION OF DRAWINGS

A preferred embodiment of the present invention will now be described with reference to the drawings in which:

FIGS. 7, 8 and 9 illustrates the percentage of oil separated (oil height over total height of the tank) during settling in configurations drawn in FIGS. 6a, 6b and 6c, respectively, with operating (ultrasound on) and non-operating (ultrasound off) plate transducers. Ultrasound was applied at 400 kHz and 230 dB by utilising the configuration in FIG. 6a.

DESCRIPTION OF EMBODIMENTS

Figure 1:
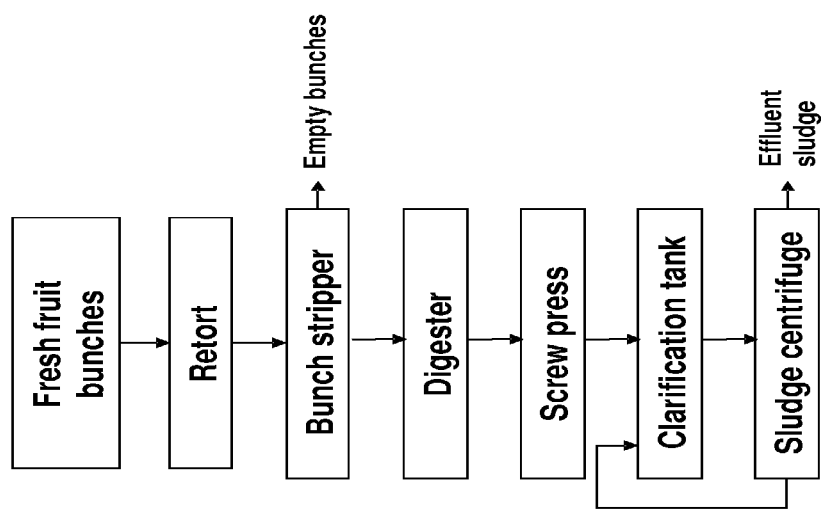
FIG. 1 illustrates the steps in the conventional method of extracting palm oil as described by (Berger K G 1983, Production of Palm Oil from Fruit, JAOCS, vol. 60, no. 2).

The invention is illustrated by the following non-limiting examples.

Example 1

Trials with Indirect High Frequency Sonication Using Ultrasonic Laboratory Systems The trials below select three points of intervention chosen to demonstrate the claimed invention, namely (1) Ex-screw press (point 3 in FIG. 2); (2) Underflow sludge (point 5 in FIG. 2); and (3) Effluent sludge (Sludge ex-centrifuge) (point 6 in FIG. 2).

Three ultrasonic methods were selected to treat selected samples: ultrasound 1 (US1) using a long titanium rod type sonotrode or a short titanium rod sonotrode, ultrasound 2 (US2) and a two-step method (US1 and US2). After mixing and preheating to 70° C. the samples were pumped through the ultrasonic system. The mixture was recirculated through the US1 system. In the US2 system, transducers are placed in a water bath at 70° C. and indirectly emit sound through the walls of a plastic centrifuge tube holding palm oil material.

$US1_l$ is produced by a long titanium rod type sonotrode using a frequency of 20 kHz and power of 238 dB $US1_s$ is produced by a short titanium rod type sonotrode using a frequency of 20 kHz and power of 238 dB US2 uses frequencies of 400 kHz and 1.6 MHz and power of 231 dB.

Figure 2:
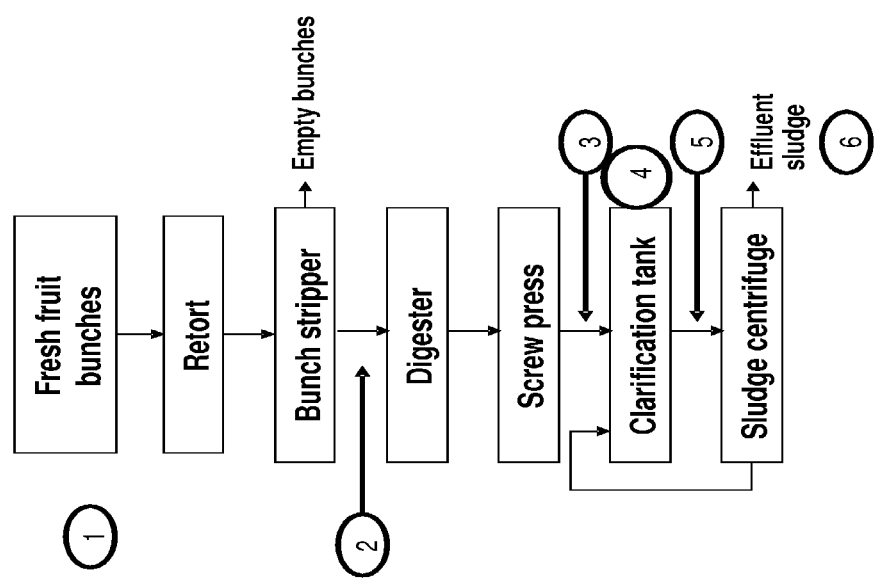
FIG. 2 illustrates the steps for ultrasound interventions in the whole palm oil milling process for extraction of palm oil.
Figure 3:
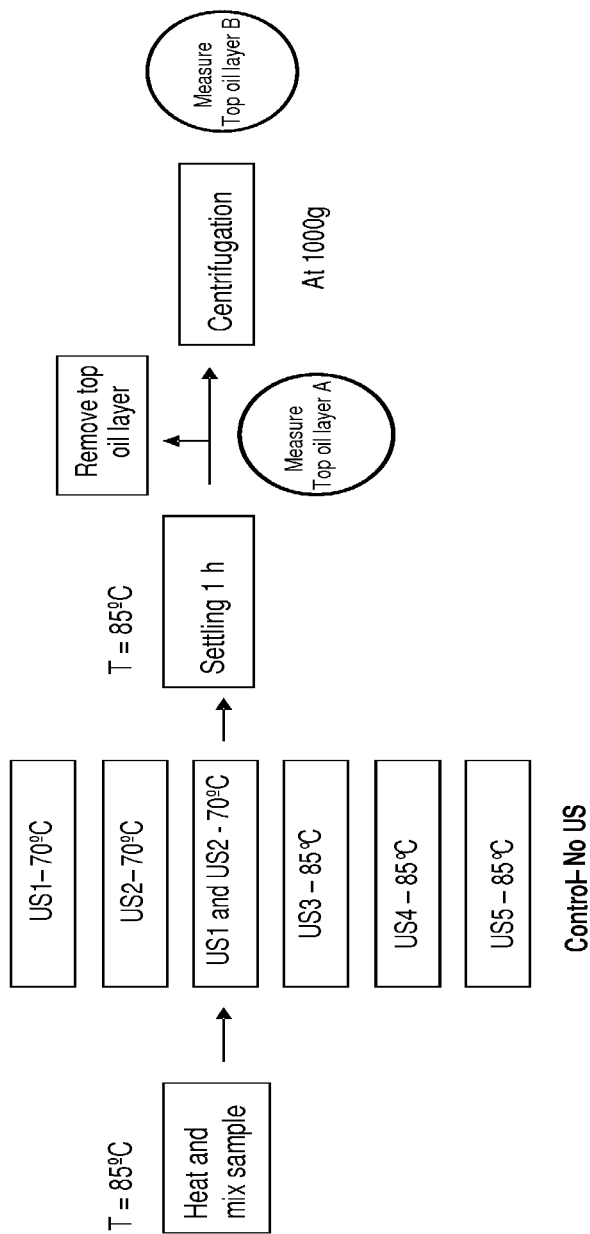
FIG. 3 illustrates the steps exemplified in the examples where US1-US5 are separate interventions at selected frequencies.
Figure 4:
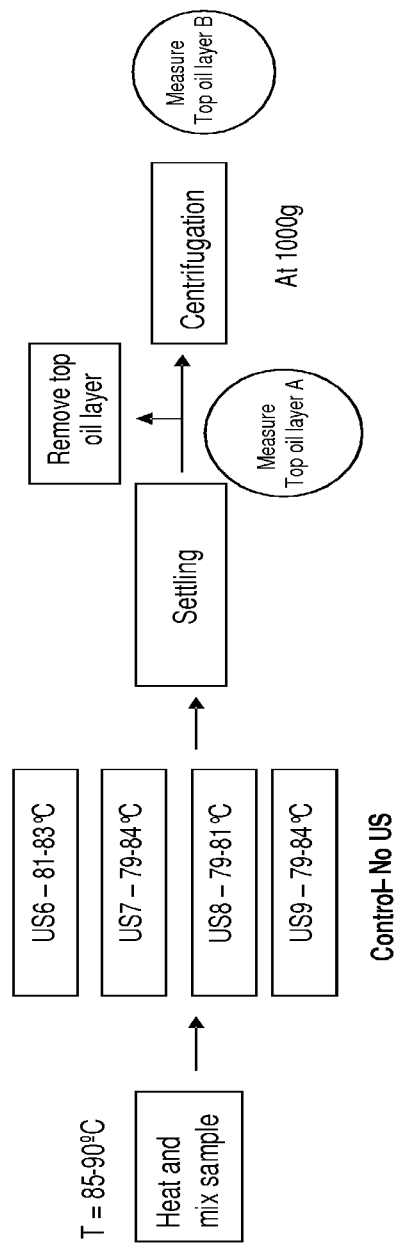
FIG. 4 illustrates the steps exemplified in the Example 3 where US6-US9 are separate interventions at selected frequencies.
Figure 5:
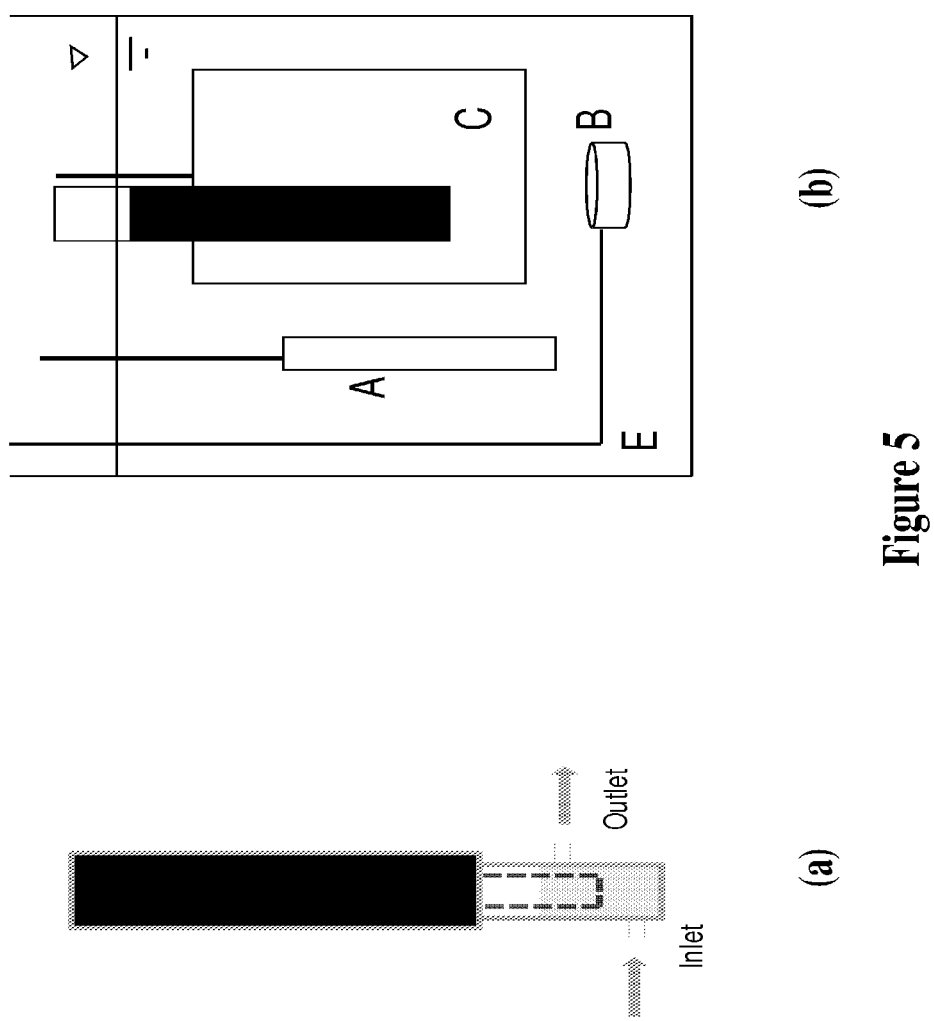
FIG. 5 illustrates two ultrasonic laboratory systems, where 4a is a diagrammatic longitudinal section of a flow through sonotrode transducer horn and 4b is a diagrammatic longitudinal section of a water bath containing a settling tube (D) and three transducers. The tube is placed between two perpendicular plate transducers (A and C) and a third transducer (B) is placed underneath the tube.

In FIG. 2 points 1-5 are separate interventions at selected frequencies.

The flow through sonotrode horn utilised for US1 at frequency of 20 kHz facilitates breakdown of the plant tissue and oil bearing cells and coalescence of released oil is facilitated with application of higher frequencies. Ultrasonic frequencies (400 kHz-2 MHz) obtained with plate transducers (US2) unmix/split oil emulsion through coalescence and oil stripping from solid particulate interfaces by streaming. The decanter (also called clarifier) offers a static system where an undisturbed ultrasonic field allows coalescence to occur. Increased coalescence promotes separation, decreasing the oil concentration in the underflow sludge at the bottom of the decanter, therefore decreasing residence times. The transducer three dimensional set up can be arranged to bring oil particles together to a point and enhance coalescence. Further coalescence can be obtained by pulsing.

Ultrasonic treated and non-treated samples were placed in a settling tube and left to stand in a water bath at 85° C. for 1 hour. The height of the oil from the top layer was measured and the oil separated was removed by pipetting. The remaining sludge was then centrifuged at 1000 g and the height of the oil separated was measured. Results are expressed as % oil volume separated from sample on a feed volume basis.

Tables 1, 2 and 3 summarise the oil separation after different ultrasonic treatment combinations in the ex-screw press oil and in the sludge ex-centrifuge after ultrasound treatment. The three ultrasonic methods $US1_l$, US2 and $US1_l$+US2 provided increased yield in the ex-screw press feed sample (Table 1). This is partly due to an enhanced separation during settling. The most remarkable case is when using plate transducers (US2) with a 25% increase with respect to the static control during settling, which also indicates a faster rate of separation. However, ultrasonic method US1, caused emulsification of the oil and reduced oil separation (Table 2).

However, the only method that significantly enhanced oil separation in the underflow sludge from the settling tank was US2 showing an additional 7% oil removal after decanting and an additional oil removal of 4% with respect to the static control.

Results show the advantage of using plate transducers alone, as opposed to when the sludge was treated with the flow through low frequency sonotrodes. Combination of both plates and sonotrode type transducers also provided negative results.

TABLE 1

Total oil recovery in the ex-screw press feed after ultrasound treatment. US1l is produced by a long rod sonotrode. Percentage indicates mL of decantable oil in 100 mL feed basis.

| Treatment | Vol. oil after settling 1 h at 85° C. (%) | Vol. oil after removing top layer and 1000 g centrifugation (%) | Total oil removed (%) |
|---|---|---|---|
| Control (static) | 18 ± 2 | 26 ± 1 | 44 |
| Control (pumped) | 19 ± 1 | 33 ± 1 | 52 |
| $US1_l$ | 19 ± 1 | 35 ± 1 | 54 |
| US2 | 29 ± 2 | 25 ± 5 | 54 |
| $US1_l$ + US2 | 21 ± 1 | 35 ± 4 | 56 |

TABLE 2

Total oil recovery in the ex-screw press feed after ultrasound treatment. $US1_s$ is produced by a short rod sonotrode. Percentage indicates mL of decantable oil in 100 mL feed basis.

| Treatment | Vol. oil after settling 1 h at 85° C. (%) | Vol. oil after removing top layer and 1000 g centrifugation (%) | Total oil removed (%) |
|---|---|---|---|
| Control (static) | 26 ± 2 | 12 ± 1 | 38 |
| Control (pumped) | 24 ± 1 | 17 ± 4 | 41 |
| $US1_s$ | 3 ± 1 | 23 ± 1 | 26 |
| US2 | 35 ± 2 | 11 ± 2 | 46 |
| $US1_s$ + US2 | 30 ± 1 | 16 ± 4 | 46 |

TABLE 3

Total oil recovery in the underflow sludge from the settling tank after ultrasound treatment. $US1_f$ is produced by a focus sonotrode. Percentage indicates mL of decantable oil in 100 mL feed basis.

| Treatment | Vol. oil after 1 h at 85° C. (%) | Vol. oil after removing top layer and 1000 g centrifugation (%) | Total oil removed (%) |
|---|---|---|---|
| Control (static) | 2 ± 1 | 17 ± 1 | 19 |
| Control (pumped) | 3 ± 1 | 17 ± 1 | 20 |
| $US1_l$ | 0 | 15 ± 1 | 15 |
| US2 | 9 ± 1 | 14 ± 1 | 23 |
| $US1_l$ + US2 | 0 | 14 ± 1 | 14 |

Example 2

Pilot-Scale Trials with Plate Transducers Immersed Inside the Vessel

Figure 6:
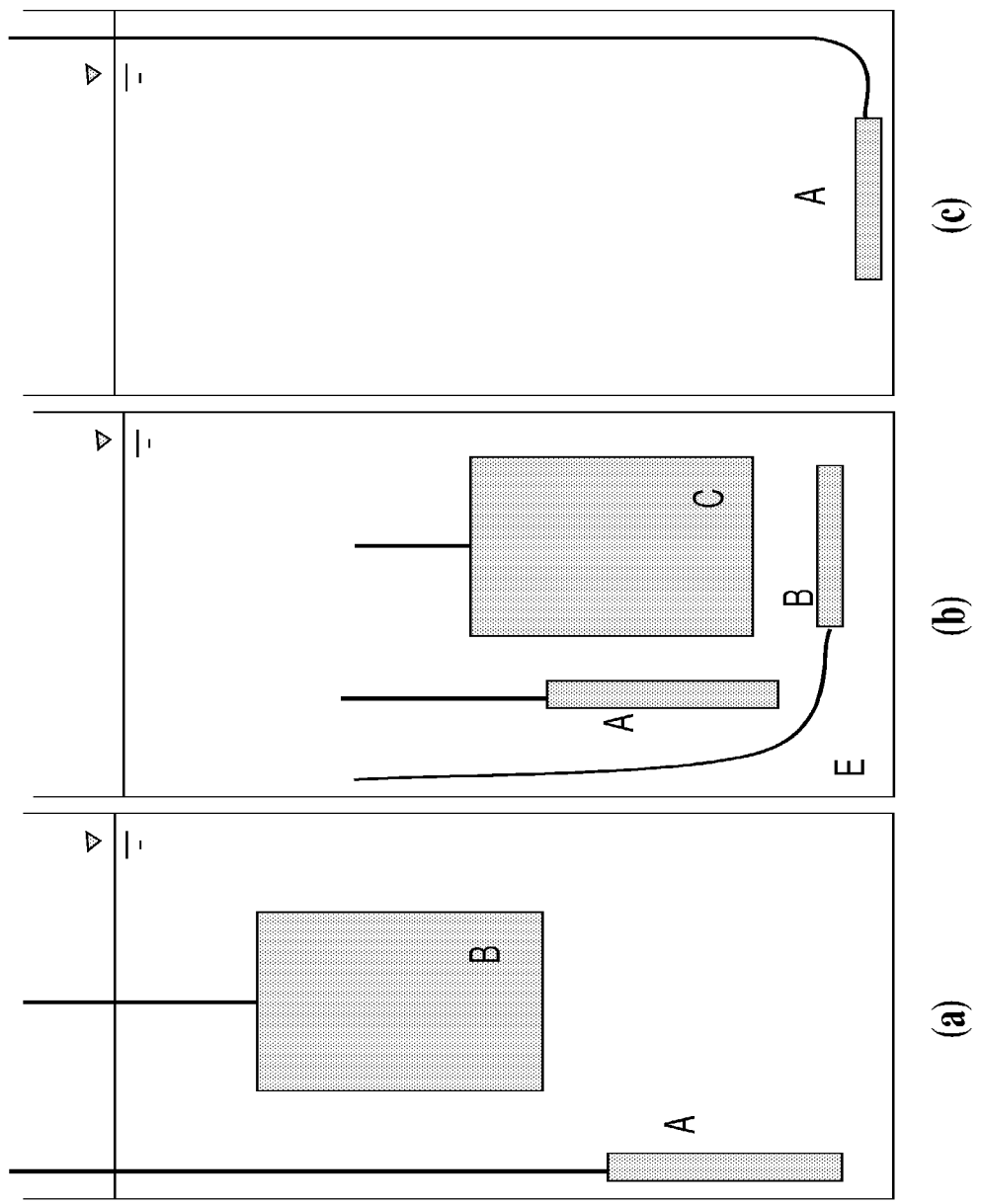
FIG. 6 illustrates three ultrasonic factory systems where, (a) is a diagrammatic longitudinal section of a tank with two plate transducers vertically collocated in perpendicular planes at separate tank levels; (b) is a diagrammatic longitudinal section of a tank with two plate transducers vertically collocated in perpendicular planes at the same level and a third transducer; and (c) is a diagrammatic longitudinal section of a tank with a plate transducer two horizontally collocated at the bottom of the tank.

Pilot-scale trials further demonstrate other ultrasonic treatment conditions for enhanced oil extraction in various plate transducer configurations and with single frequencies or multiple frequency combinations. Ultrasound was applied to the ex-screw press feed (point 3 in FIG. 2): ultrasound 3 (US3), ultrasound 4 (US4), and ultrasound 5 (US5); configurations in FIG. 6*a*, *b*, and *c*, respectively). Fresh samples were obtained directly from the factory processing line at 85° C. and processed directly in an ultrasonic vessel for each configuration. In all cases transducers were held vertically or horizontally inside the vessel and directly emit sound into the palm oil material.

- US3 uses a frequency of 400 kHz and power between 222 to 227 dB with two vertical plate transducers arranged perpendicularly in two different planes;
- US4 uses frequencies of 400 kHz (only), or 400 kHz and 1 MHz, or 400 kHz and 2 MHz and power of 224 to 226 dB; two vertical 400 kHz plate transducers were perpendicularly arranged to operate with higher frequency transducers horizontally located at the bottom; and
- US5 uses frequencies of 400 kHz, or 1 MHz, or 2 MHz and a power of 221 dB with transducers placed horizontally at the bottom of the tank.

Oil separation during settling was followed in two identical tanks filled with the same ex-screw press feed. Settling in one of the tanks occurred with operating transducers (ultrasound on), while the other tank had no operating transducers (ultrasound off). The height of the oil layer in each tank was measured at the end of the run. Results are expressed as % oil separation from samples. Samples were taken at various heights of the tank, centrifuged at 1000 g, and the volume of oil separated was measured. The oil remaining in the sludge after centrifugation and the oil content in the original feed were analysed using a Soxhlet method.

Figure 7:
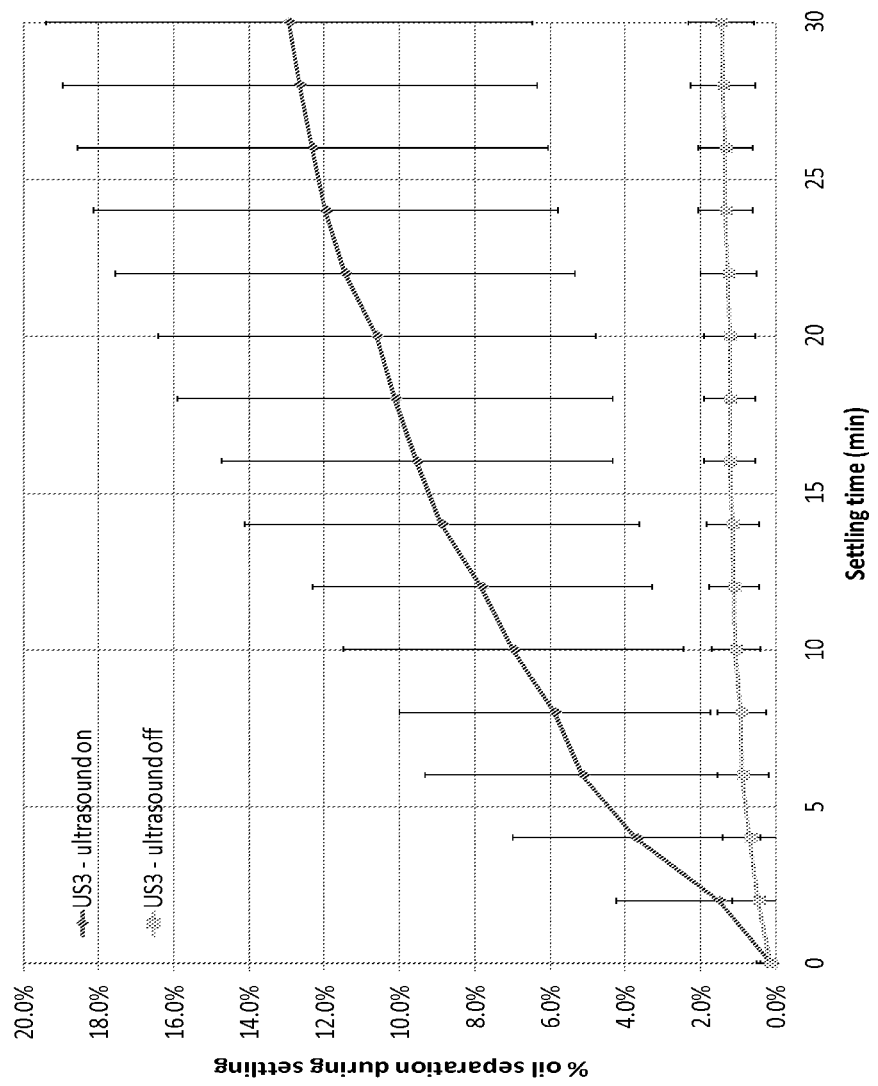
Figure 8:
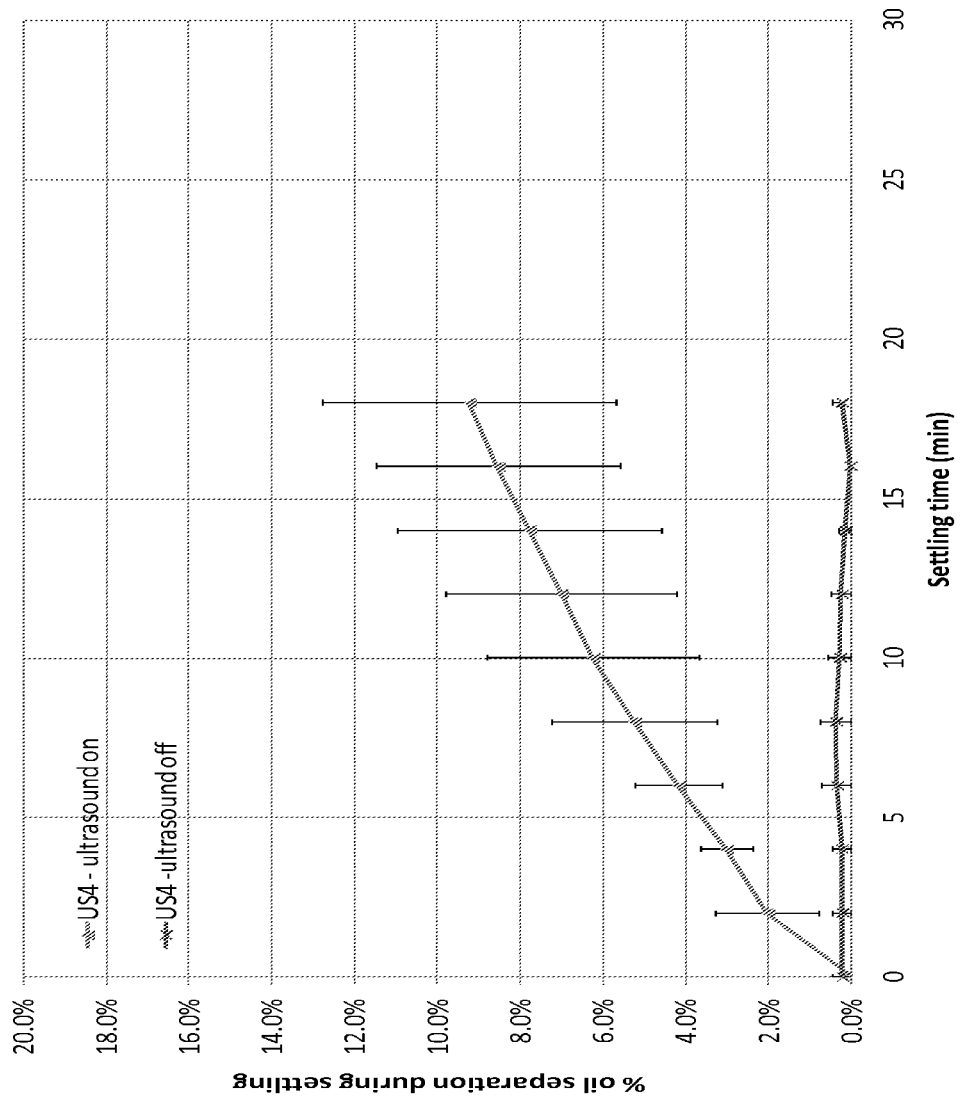
Figure 9:
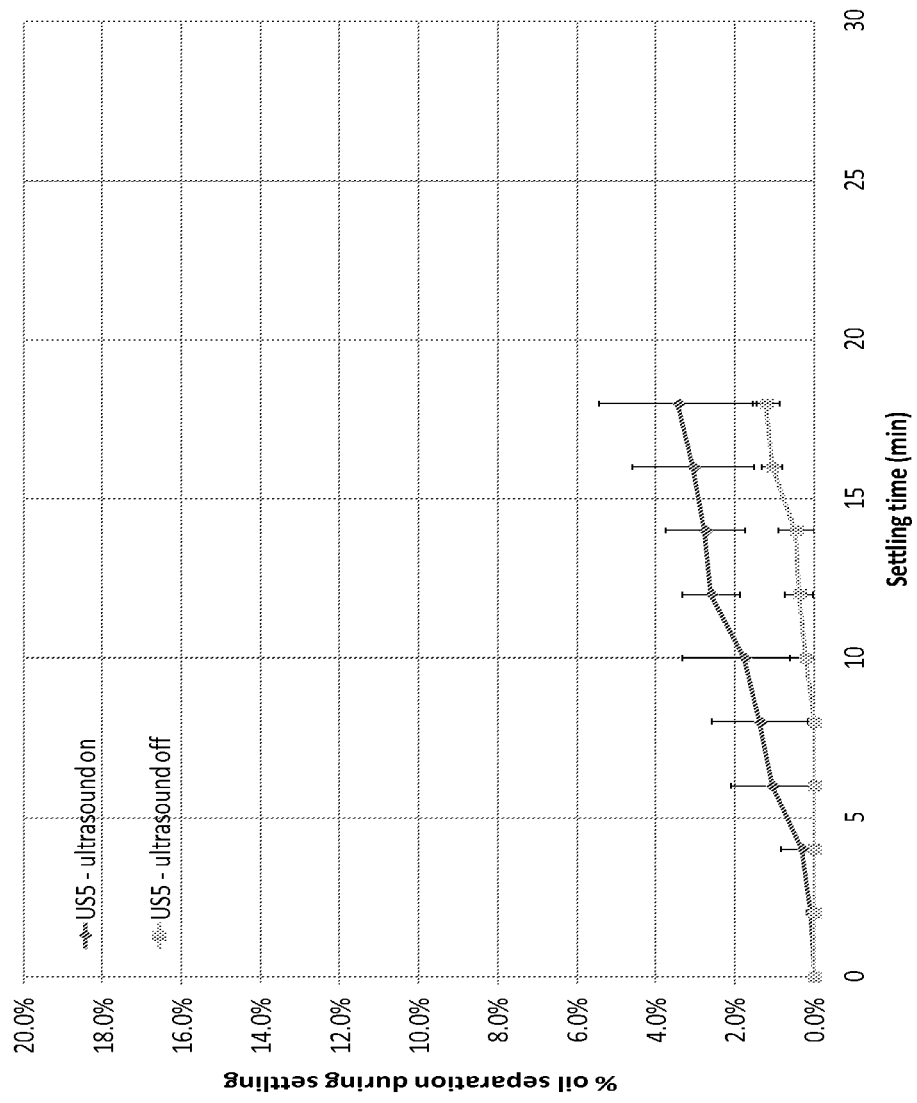

Table 4 summarises the amount of oil separation from various ultrasonic treatment combinations in the ex-screw press oil and FIGS. 7, 8 and 9 represent the increased rate of separation achieved with ultrasound. The three ultrasonic methods US3, US4 and US5 provided increased oil removal in the ex-screw press oil sample (Table 4). A faster oil separation was observed when exposed to all transducer configurations. The most remarkable case is US3 with a 700% increase in oil separation compared to the respective static control. Soxhlet analysis also indicated a 44% reduction of the oil remaining in the sludge after centrifugation.

TABLE 4

Total oil recovery in the ex-screw press feed after ultrasound treatment with transducers immersed in the vessel. Percentage indicates L of decantable oil in 100 L feed basis.

| Treatment | Vol. oil at 85° C. (%)$^a$ | Vol. oil after 1000 g centrifugation (%) | Total oil removed (%) |
| --- | --- | --- | --- |
| Control 3 | 2 ± 0 | 35 ± 3 | 37 |
| US3 | 11 ± 5 | 43 ± 3 | 54 |
| Control 4 | 1 ± 2 | 40 ± 4 | 41 |
| US4 | 8 ± 4 | 42 ± 6 | 50 |
| Control 5 | 1 ± 1 | 43 | 44 |
| US5 | 3 ± 1 | 40 | 43 |

From the above it can be seen that this invention provides a significant improvement in yield of oil for specific plate transducer arrangements. In particular, benefits can be seen from using a single plate transducer in vertical form, and its combinations with another vertical plate located at a perpendicular plane, either at the same or at different levels of the settling tank. It is worth noticing that even though faster separation of oil was obtained using horizontal plate transducers, these could not provide additional oil yield. Nevertheless, acceleration of oil removal entails significant benefits in reducing production times.

Example 3

Pilot-Scale Trials with Transducers Mounted Outside the Vessel (with Active Face in Direct Contact with the Sample)

Additional pilot-scale trials demonstrate that high frequencies are efficient in enhancing oil extraction when using transducers externally mounted on pre-fabricated windows (or cut outs) across the vessel walls. This prototype (FIG. 10) has the advantage that only the active area of the transducers is in direct contact with the sample thereby reducing the heat load on the transducer and increasing its lifetime. The pilot-scale systems in FIGS. 10*a* and 10*b* have been designed to accommodate 600 kHz and 400 kHz transducers, respectively. The system parts are assigned with numbers indicating the following: (1) spare cut-out cover, (2) holder clamp bar, (3) assembly screw, (4) cut-out support frame, (5) transducer cooling port, (6) transducer signal port, (7) 600 kHz plate transducer, (8) side window, (9) removable covers, (10) bottom sampling port, (11) top sampling port, (12) upper sampling port, (13) lower sampling port, and (14) 400 kHz transducer plate.

Figure 10:
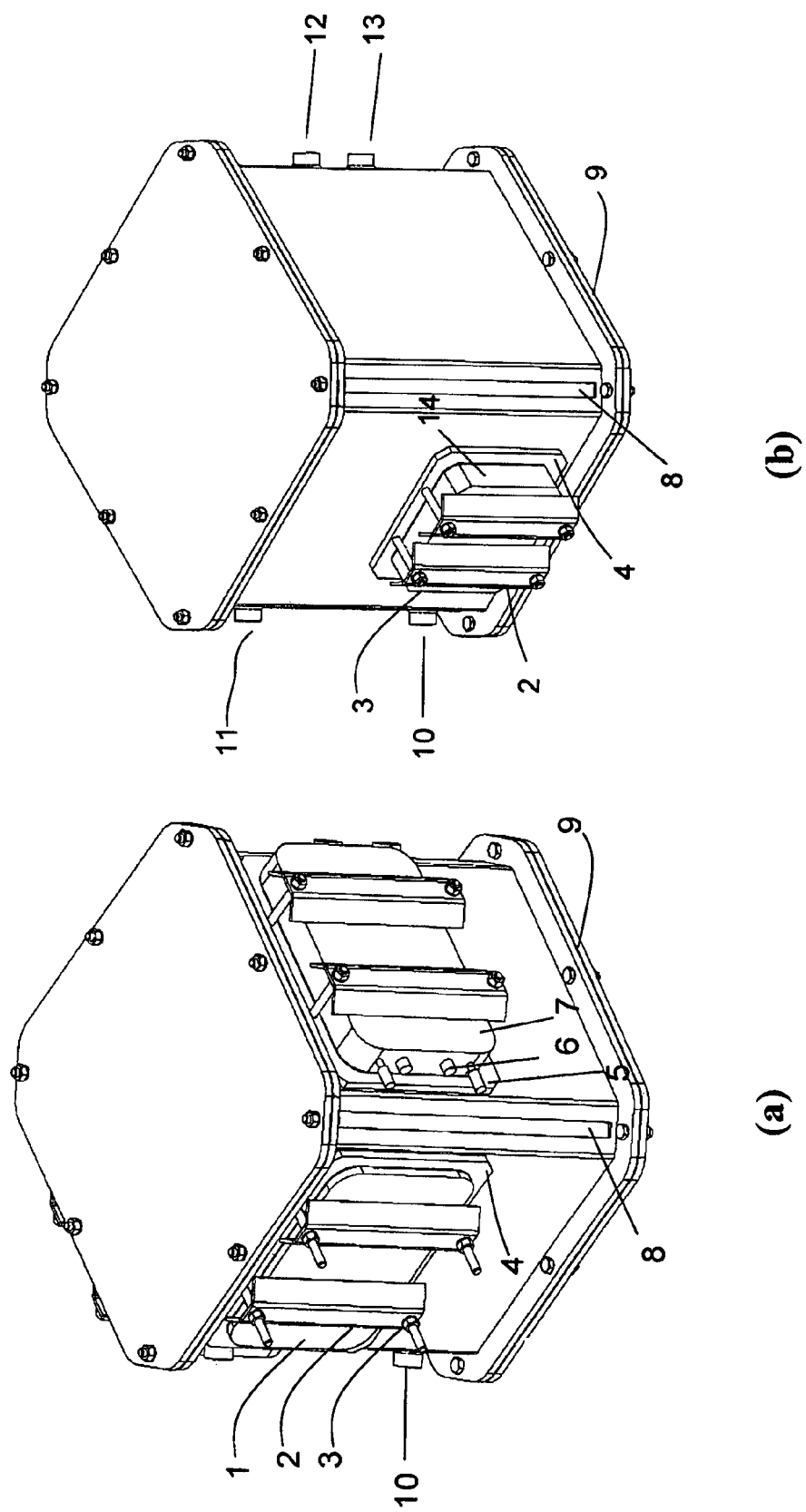
FIG. 10 illustrates two ultrasonic pilot-scale systems where the transducer is mounted outside the tank such that the active area of the transducers maintains direct contact with the sample through a cut-out section in the tank.

Ultrasound was applied to the ex-screw press feed (point 3 in FIG. 2): ultrasound 6 (US6), ultrasound 7 (US7), and ultrasound 8 (US8); configurations in FIG. 10). Samples were obtained directly from the factory processing line at 85° C. and processed directly in an ultrasonic vessel for each sound condition.

- US6 uses a frequency of 600 kHz and power of 230 dB with a single transducer plate externally mounted against the side wall of the vessel with a cut-out window;
- US7 uses a frequency of 400 kHz and power of 220 dB with a single transducer plate externally mounted against the side wall of the vessel with a cut-out window;
- US8 and US9 use a frequency of 600 kHz and power of 220 and 224 dB, respectively with a single transducer plate externally mounted against the side wall of the vessel with a cut-out window.

Table 5 summarises the amount of oil separation from single treatments at the same frequency in the ex-screw press oil. The three replicate runs at US6 provided increased oil removal than the static control in the ex-screw press oil sample after settling (Table 5) and also an increase in total decantable oil removal (Table 5).

Table 6 summarises the amount of oil separation in the ex-screw press oil from parallel treatments in two vessels using the same feed at two 400 kHz and 600 kHz. This comparison demonstrates that higher frequencies (600 kHz) are as effective as treatment at 400 kHz.

TABLE 5

Total oil recovery in the ex-screw press feed at the settling tank after ultrasound treatment with transducers adjusted outside the vessel. Percentage indicates kg of decantable oil in 100 kg feed basis.

| Treatment | Weight oil after 1 h at 85° C. (%) | Weight oil after removing top layer and 1000 g centrifugation (%) [a] | Total oil removed (%) |
|---|---|---|---|
| Run 1 | | | |
| Control 6 | 11 | 20 | 31 |
| US6 | 22 | 10 | 32 |
| Run 2 | | | |
| Control 6 | 1 | 31 | 32 |
| US6 | 19 | 14 | 33 |
| Run 3 | | | |
| Control 6 | 0.3 | 32 | 32 |
| US6 | 22 | 12 | 34 |

TABLE 6

Total oil recovery in the ex-screw press feed at the settling tank after ultrasound treatment with transducers adjusted outside the vessel. Percentage indicates kg of decantable oil in 100 kg feed basis.

| Treatment | Weight oil after 1 h at 85° C. (%) | Weight oil after removing top layer and 1000 g centrifugation (%) | Total oil removed (%) |
|---|---|---|---|
| Run 1 | | | |
| US7 | 17 | 25 | 42 |
| US8 | 14 | 27 | 41 |
| Run 2 | | | |
| US7 | 18 | 37 | 55 |
| US9 | 21 | 41 | 62 |

From the above it can be seen that this invention provides a significant improvement in yield of oil for specific plate transducer arrangements. In particular, benefits can be seen from using a single plate transducer in vertical form, and its combinations with another vertical plate located at a perpendicular plane, either at the same or at different levels of the settling tank. It is worth noticing that even though faster separation of oil was obtained using horizontal plate transducers, these could not provide additional oil yield. Nevertheless, acceleration of oil removal entails significant benefits in reducing production times.

Those skilled in the art will understand that this invention may be implemented in embodiments other than those described. Other likely points of intervention are shown in FIG. 2.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

It will be appreciated by persons skilled in the art that numerous variations and/or modifications may be made to the invention as shown in the specific embodiments without departing from the scope of the invention as broadly described. The present embodiments are, therefore, to be considered in all respects as illustrative and not restrictive.

The invention claimed is:

1. A method of extracting oil from a premacerated oil-bearing material, the method comprises the steps of:
   a) subjecting the premacerated oil-bearing material to at least one sonication step, wherein at least one plate transducer emitting a frequency of at least 400 kHz is employed to create a standing wave in the premacerated material;
   b) separating the premacerated material into components to form a first oil phase and a retained material phase;
   c) removing the first oil phase;
   d) optionally subjecting the retained material phase to at least a second sonication step and removing a second oil phase.

2. The method according to claim 1, wherein at least two plate transducers are used during the sonication step.

3. The method according to claim 2, wherein the at least two plate transducers emit at different sonication frequencies.

4. The method according to claim 3, wherein two sonication frequencies are used one being up to 1 MHz and the other being above 1 MHz.

5. The method according to claim 1, wherein during step (a) the premacerated material is heated to a temperature of between 0° C. to 90° C.

6. The method according to claim 5, wherein during step (a) the premacerated material is heated to a temperature of between 40 to 85° C.

7. The method according to claim 5, wherein during step (a) the premacerated material is heated to a temperature of between 55 to 65° C.

8. The method according to claim 1, further comprising subjecting the retained material phase to a centrifugal separation to obtain a further yield of oil.

9. The method according to claim 1, wherein the premacerated material is selected from a group consisting of fruit, vegetables, cereals, grasses, seeds, and mixtures thereof.

10. The method according to claim 9, wherein the fruit is derived from an oil palm tree.

11. The method according to claim 1, wherein the method is a continuous method.

12. The method according to claim 1, wherein a sound pressure level applied to the premacerated oil-bearing material is between about 1 to about 260 dB.

13. The method according to claim 12, wherein the sound pressure level is between 180 and 240 dB (related to a reference sound pressure amplitude of $10^{-6}$ Pa).

14. The method according to claim 4, wherein high frequency plate transducers are mounted outside of a vessel with its active face in contact with the oil material.

15. The method according to claim 2, wherein during step (a) the premacerated material is heated to a temperature of between 0° C. to 90° C.

16. The method according to claim 3, wherein during step (a) the premacerated material is heated to a temperature of between 0° C. to 90° C.

17. The method according to claim 4, wherein during step (a) the premacerated material is heated to a temperature of between 0° C. to 90° C.

18. The method according to claim 5, further comprising subjecting the retained material phase to a centrifugal separation to obtain a further yield of oil.

19. The method according to claim 8, wherein the premacerated material is selected from a group consisting of fruit, vegetables, cereals, grasses, seeds, and mixtures thereof.

* * * * *